United States Patent [19]

Scantland et al.

[11] Patent Number: 5,173,308

[45] Date of Patent: Dec. 22, 1992

[54] STEAM PLATEN FOR TIRE CURING PRESS

[75] Inventors: Joe F. Scantland; Thomas A. Flory, both of Akron, Ohio

[73] Assignee: Scantland Industries, Inc., Copley, Ohio

[21] Appl. No.: 815,967

[22] Filed: Jan. 2, 1992

[51] Int. Cl.⁵ .............................................. B29C 35/00
[52] U.S. Cl. ........................................ 425/40; 249/79; 425/50
[58] Field of Search ................... 249/79; 425/28.1, 40, 425/50

[56] References Cited

U.S. PATENT DOCUMENTS 1,469,747  10/1923  Winter .............................. 249/79 X
1,544,002   6/1925  Grove ................................. 425/40

Primary Examiner—Charles Hart
Attorney, Agent, or Firm—Oldham Oldham & Wilson Co.

[57] ABSTRACT

The steam platen comprises spaced flat horizontal exterior walls each having a horizontal outside surface, and concentric cylindrical walls, one an inside wall and the other an outside wall both of which extend from the first to the second flat wall. The first flat wall abuts a mold half and the second flat wall abuts a supporting structure such as a base or a head, and these flat walls may be termed a mold sidewall and a bolster sidewall respectively. The interior space between the first and second flat walls has a plurality of partitions which extend from one flat wall to the other and which form one or more continuous serpentine steam passages which constitute a steam cavity. This steam cavity covers the entire area of the mold and is devoid of dead spots, so that the mold sidewall is heated by the steam to an essentially uniform surface temperature. For ease of fabrication, the platen may be formed as two separate pieces, i.e., a main body portion with encompasses the first flat wall, the inside and outside cylindrical walls, and the partitions, and a flat cover plate which is welded with a steam tight fit to the main body portion so as to enclose the passages and form a steam cavity.

9 Claims, 2 Drawing Sheets

STEAM PLATEN FOR TIRE CURING PRESS

TECHNICAL FIELD

This invention relates to steam platens for rubber curing presses, and more especially to a steam platen for tire curing purposes having an improved steam cavity configuration which results in more even heat distribution across the surface of the platen, with improved uniformity of tire curing.

BACKGROUND OF THE INVENTION

A tire curing press commonly contains upper and lower mold halves, each of which is fixedly mounted on a steam platen which supplies heat to the mold for curing the tire. One of the mold half (usually the lower mold half) and its associated platen are usually stationary while the other mold half (usually the upper) and its associated platen are usually vertically reciprocable between an open position in which the mold halves are apart and a closed position in which the mold halves are together.

A steam platen commonly has two horizontal surfaces, one of which (commonly called the mold side surface) is in abutting relationship with the mold half, the other of which (commonly called the bolster side surface) is in abutting relationship with a supporting structure, e.g., a base (in the lower half of the press) or a head (in the upper half of the press). These surfaces are the outside surfaces of respective spaced horizontal walls. A steam cavity is situated between these walls. Steam (usually superheated) is supplied to the steam cavity via a steam inlet port, and steam (typically saturated with some condensate) is removed from the steam cavity via a steam outlet port.

A problem with presently known platens is that the configuration of the steam cavity is such that there are dead spots where there is little or no steam flow. Steam flow tends to channel, i.e., to follow the path of least resistance. As a result, portions of the mold side surface, i.e., those portions above or below the steam channels, are heated to a greater extent than other portions of the mold side surface, i.e., those which are above or below the dead spots. This results in a non-uniform temperature on the mold side surface of the platen and in the mold half associated with the platen. This phenomenon occurs in both the upper and the lower steam platens and their associated mold halves. As a result, the tire is cured unevenly. Cure is faster at the hotter portions or "hot spots" of the mold halves, and slower at the cooler portions or "cold spots" of the mold halves. In order to cure all of the tire sufficiently, it is necessary to heat portions of the tire to a higher temperature than is desired, and in extreme situations this may actually result in overcure of those portions. Conversely, if one opts for a desired curing temperature at the hotter portions of the mold, there is a risk of undercure of those portions of the tire which are at positions corresponding to the cold spots of the mold halves and the associated platens.

DISCLOSURE OF THE INVENTION

This invention provides a novel steam platen having a steam cavity of improved configuration, such that temperature is nearly uniform over the entire surface of the platen. This results in substantially uniform mold temperature, with attendant uniform cure of the tire. This also results is slightly faster cure times.

The novel steam platen of this invention comprises spaced horizontal walls, vertical wall means extending from one horizontal wall to the other, and partition means which together define an enclosed steam cavity consisting essentially of one or more continuous serpentine passages which provide one or more steam flow paths which are essentially free of dead spots and which provide flowing steam to essentially the entire area of the horizontal walls.

BEST MODE FOR PRACTICE OF THE INVENTION

Figure 1:
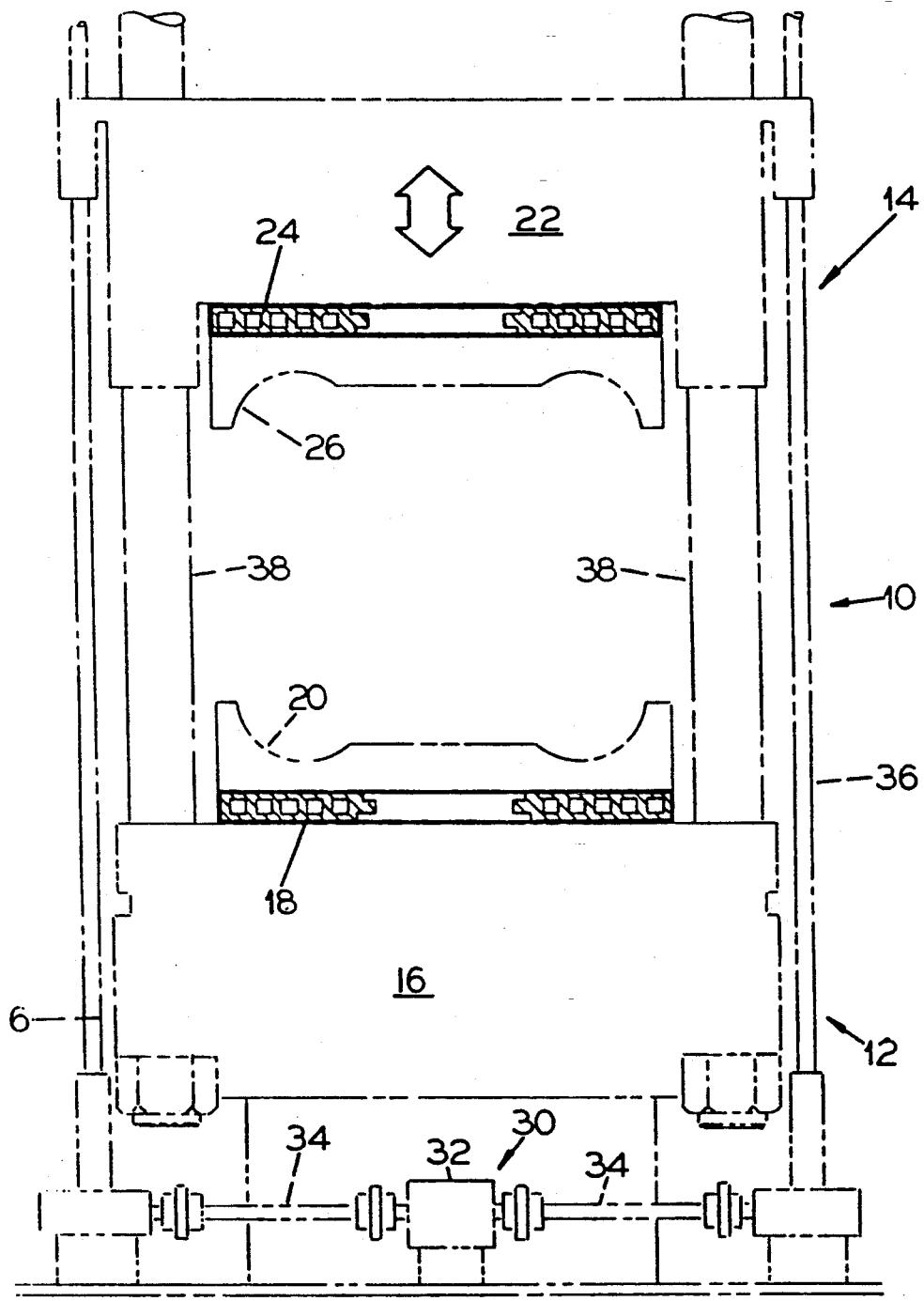
FIG. 1 is a diagrammatic representation, in front elevation of a tire curing press which incorporates steam platens according to this invention.

This invention will be described in detail with reference to a tire curing press as shown in the drawings, which illustrate the best mode and embodiment.

Referring now to FIG. 1, tire curing press 10 comprises a stationary base assembly 12 and a vertically reciprocable head assembly 14, which is positioned above the base assembly 12.

Base assembly 12 comprises, in ascending order, a base 16, a steam platen 18 which is mounted on the top surface of the base, and a lower mold half 20, which is affixed to the upper surface of the steam platen 16. Then parts are secured together to form a unitary base assembly 12.

Similarly, head assembly 14 comprises, in descending order, a head 22, an upper steam platen 24, and a top mold half 26 affixed to the bottom surface of the platen 24. These parts are secured together to form a unitary head assembly 14.

If desired, the base assembly 12 may comprise two lower steam platens 18, which are mirror images of each other, in side by side relationship, and a bottom mold half 20 affixed to each platen. Similarly, the head assembly 14 may include two upper steam platens 24, which are mirror images of each other, in side by side relationship, and a top mold half 21 affixed to each upper platen.

Tire curing press 10 further comprises a motor drive 30 which includes a motor 32, horizontal drive rods 34 driven by motor 32, and vertical ball screws 36, which raise and lower the head assembly 14. Press 10 further includes a plurality of vertical guide rods 38, which guide the vertical reciprocating movements of the head assembly 14.

The steam platens 18 and 24 are in accordance with this invention. The upper steam platen 24 will be described in detail with reference to FIGS. 2 and 3. The remaining parts described so far may be conventional. Since the upper and lower steam platens 18 and 24, respectively, are similar, only one, namely the upper steam platen 24, will be described in detail.

Figures 2, 3:
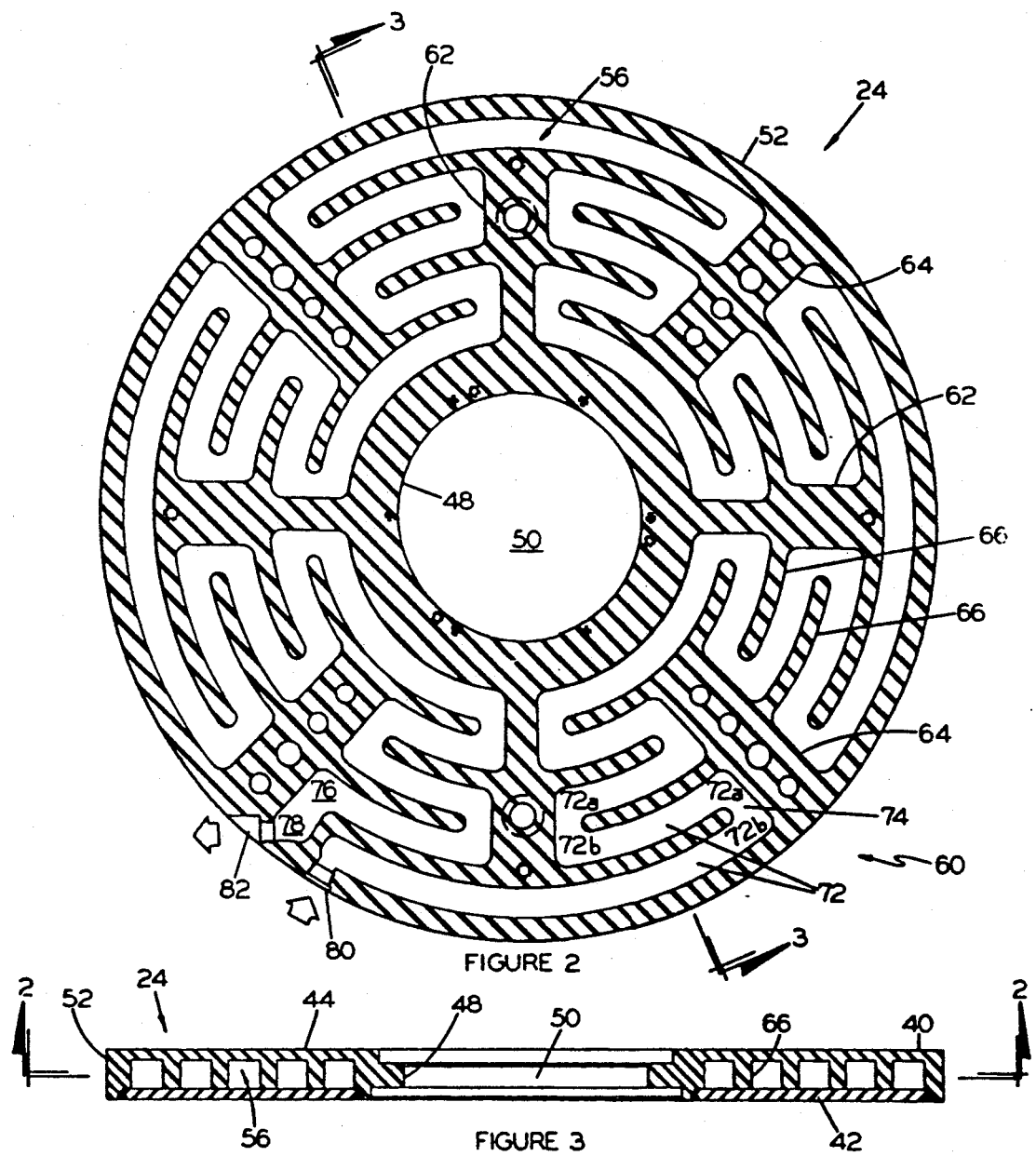
FIG. 2 is a horizontal sectional view of steam platen according to this invention, taken along line 2—2 of FIG. 3.
FIG. 3 is a vertical sectional view of a steam platen according to this invention taken along line 3—3 of FIG. 2.

Referring now to FIGS. 2 and 3, a steam platen 24 is made of a rigid heat conductive material, usually a metal or alloy thereof and preferably steel. Platen 24 is annular and circular in shape and comprises an annular main body portion 40 and a cover (or cover plate) 42, which are welded together in steam tight relationship to form a hollow annular body.

Main body portion 40 comprises a essentially flat first or mold side wall 44 (usually horizontal) having a flat horizontal outside surface (shown only in FIG. 3). The top mold half 26 is adapted to be affixed to this outside surface. Main body portion 40 further comprises a cylindrical inside wall 48 which surrounds a central hole 50, and a cylindrical outside wall 52 at the outer circumference of the platen 24, which is preferably circular. Inside wall 48 and outside wall 52 both are perpendicular to mold side wall 44 and extend in the same direction,, i.e., upwardly therefrom to the cover or second wall 42.

The cover 42 (shown only in FIG. 3) is essentially flat and forms the second or bolster side wall of platen 24. This wall is also horizontal and is spaced from the first mold side wall 44. The outside surface of cover 42, which is horizontal, is in abutting relationship with head 22. Both cover 42 and mold side wall 44 form exterior walls of the platen 24.

The first or mold side wall 44, the cover or second (or bolster side) wall 42, the inside wall 48 and the outside wall together enclose a steam cavity 56.

Platen 24 has partition means 60 (FIG. 2) comprising a plurality of vertical partitions which extend upwardly from first horizontal wall 44 to cover (or second horizontal wall) 42 and define the configuration of the steam cavity 56. The partitions form one or more continuous serpentine steam passages which together constitute the steam cavity.

The partition means 60 comprise a first set of radially extending partitions 62 (4 are shown), a second set of radially extending partitions 64 (4 are shown), and a circumferentially extending arcuate partition 66, as shown in FIG. 2. All of these partitions are integral with and extend upwardly from the mold side wall 44, as shown in FIG. 3. The partitions 62 of the first set, which are spaced apart 90°, extend from the inside wall 48 toward the outside wall 52 but terminate short thereof. The partitions 64 of the second set, also spaced apart 90°, extend radially from the outside wall 52 to the inside wall 48 but terminate short thereof. Adjacent partitions of the first and second sets are 45° apart. Arcuate partitions 66 extend circumferentially in both directions from the ends and the midpoints of radial partitions 62 and 64. Each arcuate partition 66 extends somewhat less than 45° from a radial partition 62 or 64 toward an adjacent radial partition 64 or 62 but terminates short thereof. Arcuate partitions 66 are in interleaved relationship.

The pattern of partitions shown in FIG. 2 forms a single steam passage having an inlet end and an exit end and comprising a plurality of non-intersecting arcuate passageways 72 and a plurality of non-intersecting connecting ducts 74 in alternating sequence. The nominal lengths of the arcuate passageways 72 next to the inside and outside walls 48 and 52, respectively, are 90° (actual lengths are slightly shorter). The other arcuate passageways 72 have nominal lengths of 45° (actually slightly shorter). Each arcuate passageway 72 has an upstream end 72a and a downstream end 72b. Each connecting duct 74 is a 180° U-bend which joins the downstream end 72b of one passageway 72 with the upstream end 72a of an adjacent passageway. This arrangement directs steam successively through every arcuate passageway 72 and every connecting duct 74. In other words, the arrangement is a series arrangement. There are no T intersections and no dead spots. All arcuate passageways 72 have the same cross sectional area, which is uniform from one end of the passageway to the other. A rectangular cross-sectional shape (FIG. 3) is preferred. The width of the U-bends 74 is not substantially different from the width of the arcuate passageways 72, so that the steam velocity will be substantially uniform over the entire length of the steam passage. The width of a U-bend 74 (i.e., the minimum width, as measured from the inside wall, which is the rounded end of an arcuate partition 66, to the flat mid portion of the opposite side wall) may be either slightly less than, equal to or slightly greater than (any of which can be characterized as "substantially equal to"), the width of the arcuate passageways 72. The height of the entire steam passage, including both arcuate passageways 72 and connecting ducts 74, is uniform over the entire length of the passage, so that the passage has a substantially uniform effective cross sectional area, resulting in a substantially uniform steam velocity. The side walls of the connecting ducts 74 are rounded (the outside wall having flat mid portions and curved end portions), so that there are no sharp corners. This is done to avoid dead spots for steam. The steam passage may include at its exit end a 90° (or right angle) bend 76 and a short radial exit passageway 78 in series in the order named. The 90° bend 76 is connected to the last arcuate passageway 72.

A steam inlet part 80 extends radially through the outside wall 52 and communicates with the first arcuate passageway 72, which is at the inlet end of the steam passage. A steam and condensate outlet port 82 extends through the outside wall 52, either at a 45° angle as shown or radially, and communicates with the exit passageway 78.

The platen shown in detail in FIGS. 2 and 3 is a "left hand" upper platen. Depending on the desired location of the steam inlet 80 and steam outlet 82, one may provide a "right hand" upper platen, which is a mirror image of the upper platen shown, so that the steam inlet and outlet are in the right hand half of the platen as seen in FIG. 2 instead of in the left-hand half as shown.

Holes (e.g., bolt holes) in the radial partitions 62 and 64 are unnumbered, since such holes are conventional for attaching a steam platen to the associated mold half and base or head and do not form any part of the present invention. The central hole 50 may contain conventional tire press components (the apparatus necessary for supplying steam to a bladder which is associated with the mold, for example). These details have been omitted since they do not form a part of the present invention.

A lower steam platen 18 according to this invention has not been described in detail since it will be virtually identical in structure to the upper steam platen 24 which has been described. There may be minor variations; thus, an upper steam platen 24 may have its steam outlet at an angle of 45° as shown in the drawings, while the steam outlet in the lower steam platen for the same press may extend radially.

The steam cavity configuration shown in FIGS. 2 and 3 provides a steam cavity 56 consisting of a single continuous serpentine steam passage which extends from the steam inlet port 80 to the steam outlet port 82, traversing the entire platen 24. In the embodiment shown, steam introduced under pressure via inlet port 80 flows first to the first arcuate passageway 72, then to the first U-bend 74, then to the second arcuate passageway 72, and so on above the entire area of mold side wall 44, and is discharged via steam and condensate outlet port 82. In the course of flow from inlet 80 to outlet 82, steam flows above the entire area of mold side wall 44, so that the temperature of the outer surface of the wall 44 is nearly uniform. As a result, the temperature of the mold half 22 is also nearly uniform. This results in substantially uniform curing of the tire. It also results in slightly faster curing time than is obtained with presently known platens, since the minimum platen surface temperature herein will be slightly higher than the minimum platen surface temperature in presently known molds, due to the absence of dead spots. These dead spots are avoided herein by a steam passage pathway which covers the entire area of the mold sidewall 44 and by the rounded corners in the U-bend 74. The steam passage configuration shown in FIGS. 2 and 3 also minimizes steam pressure loss between the inlet 80 and outlet 82.

The particular mold steam cavity configuration shown in FIGS. 2 and 3 is illustrative, but similar results can be obtained with other steam passage configurations. For example, instead of a single steam passage through the entire steam cavity as shown, the steam cavity may consist of two or more separate steam passages, each traversing a sector of the platen, and the steam passages between them supplying steam to the entire surface area of mold sidewall 44. Thus, for example, there may be two continuous serpentine steam passages, each with its own steam inlet and steam outlet and each traversing one half (i.e., a 180° sector) of the area of wall 44. Similarly, there may be 3 steam passages, each covering a 120° sector, or four (4) steam passages each covering a 90° sector, etc. A separate steam inlet 80 and steam and condensate outlet 82 for each steam passage is provided.

The steam passage configuration shown, comprising arcuate steam passageways 72 and connecting ducts 74 in the form of 180° U-bends, while highly desirable from both the standpoint of fabrication and the standpoint of use, is also illustrative rather than limitative. Other patterns may be adopted, although in most if not all cases the steam passage will be continuous from steam inlet to steam outlet, will be serpentine and will comprise steam passageways or segments of relatively gentle curvature (and in some situations even straight) and of uniform cross-sectional area with relatively short connecting ducts, which are typically (although not necessarily always) more sharply curved than the passageways. As in the illustrated embodiment, partitions between adjacent passageways will be relatively thin, and each steam passage will be free of intersections and sharp corners which would provide dead spots. To achieve this freedom from intersections, the passageways will be non-intersecting (i.e., no two passageways such as passageways 72 as shown will intersect), and no two connecting ducts 74 will intersect. Also to achieve substantially uniform heat distribution over the entire surface of mold side wall 44, the volume ratio of partitions (e.g., 62, 64 and 66) to void space (i.e., steam cavity 56) should be essentially constant over the entire portion of the platen 44 between the inside wall 48 and the outside wall 52.

A steam platen having a desired steam cavity configuration, such as that shown in FIGS. 2 and 3, can be obtained with a computer controlled milling machine. The milling machine may be conventional. The desired configuration of partitions 60 is obtained by milling the main body portion 40. The cover 42 is welded to the milled main body portion 40 to form a platen 24 of unitary structure.

While this invention has been described with particular reference to a platen for a tire press, platens for apparatus for making other molded rubber articles, including for example molded rubber sealing strips, windshield wiper blades, golf balls and tennis balls, can also be fabricated in accordance with this invention.

While this invention has been disclosed in detail with specific reference to the best mode and preferred embodiments thereof, it shall be understood that such disclosure is by way of illustration and not limitation.

What is claimed is:

1. A steam platen for a rubber curing press, said steam platen being made of a rigid heat conductive material; said steam platen having wall means and partition means which together define a steam cavity, said steam cavity consisting essentially of at least one continuous serpentine steam passage, said steam passage having an inlet end and an exit end and comprising a plurality of non-intersecting passageways and a plurality of non-intersecting connecting ducts arranged in alternating sequence, said passageways having equal cross sectional areas and being of essentially uniform cross sectional area, each said steam passage proving a continuous flow path for steam from its inlet and to its exit end; said steam platen further comprising a steam inlet and a steam and condensate outlet in communication with said passage; said passage means extending over substantially the entire area of said platen so as to provide a substantially uniform platen surface temperature.

2. A steam platen according to claim 1 wherein said rigid heat conductive material is a metal or alloy thereof metallic material.

3. A steam platen according to claim 2 wherein said metal or alloy thereof is steel.

4. A steam platen according to claim 1 wherein the volume ratio of said passage means to said partition means is substantially uniform over the entire area of said platen.

5. A steam platen according to claim 1 wherein each of said passageways has an upstream end and a downstream end and each of said connecting ducts connects the downstream end of one passageway to the upstream end of an adjacent passageway.

6. A steam platen according to claim 1 wherein said non-intersecting passageways are arcuate, said connecting ducts are U-bends, each of which connects an end of one arcuate passageway with an end of an adjacent arcuate passageway.

7. A steam platen according to claim 1, said steam platen being annular and circular in shape and comprising a first essentially flat exterior wall having a flat outside surface which is adapted to abut a mold half, a second essentially flat exterior wall which is spaced from said first essentially flat wall, an essentially cylindrical inside wall and an essentially cylindrical outside wall concentric therewith, each extending from said first essentially flat wall to said second essentially flat wall, and wherein said partition means comprise a plurality of partitions extending from said first wall to said second wall, and said partition means together define said at least one continuous serpentine steam passage.

8. A steam curing press according to claim 1 wherein said rubber curing press is a tire curing press.

9. A steam platen according to claim 7, wherein said partition means comprise a first set of equiangularly spaced radial partitions extending from said inside wall to said outside wall but terminating short thereof, a second set of equiangularly spaced radial partitions extending from said outside wall toward said inside wall but terminating short thereof, and a plurality of arcuate partitions extending circumferentially from said radial partitions.

* * * * *